(12) United States Patent
Lee et al.

(10) Patent No.: US 7,129,919 B2
(45) Date of Patent: Oct. 31, 2006

(54) FLASH MEMORY BROADCASTING DISPLAYER PANEL

(76) Inventors: Sung Lee, 50 Del Ventura, Irvine, CA (US) 92606; Robert Kim, 13 Wandering Rill, Irvine, CA (US) 92612; Hyuk Jegal, 1001-5, Daichi-Dong, Kangnam-Gu, Seoul (KR); Sang Duk Jung, 1001-5, Daichi-Dong, Kangnam-Gu, Seoul (KR)

( * ) Notice: Subject to any disclaimer, the term of this patent is extended or adjusted under 35 U.S.C. 154(b) by 578 days.

(21) Appl. No.: 10/697,936

(22) Filed: Oct. 31, 2003

(65) Prior Publication Data

US 2005/0093794 A1   May 5, 2005

(51) Int. Cl.
G09G 3/36 (2006.01)

(52) U.S. Cl. .......................................... 345/87; 361/681

(58) Field of Classification Search .................. 345/87, 345/104; 361/681, 683, 684; 348/554, 567; 358/1.15, 1.16; 725/151; 711/115
See application file for complete search history.

(56) References Cited

U.S. PATENT DOCUMENTS 6,882,326 B1 *  4/2005  Hirayama et al. ........... 345/1.1

* cited by examiner

Primary Examiner—Richard Hjerpe
Assistant Examiner—Abbas Abdulselam
(74) Attorney, Agent, or Firm—Eugene Oak

(57) ABSTRACT

A flash memory broadcasting displayer panel is comprised of 1) a flash memory card, 2) an interface card, and 3) a Liquid Crystal Displayer. Time sequence type files, which are stored in the flash memory card, are processed by the interface card and transferred to the Liquid Crystal Displayer. The interface card includes a microprocessor operating with an internal BUS to control, process and route signals between the flash memory and the Liquid Crystal Displayer.

4 Claims, 3 Drawing Sheets

FLASH MEMORY BROADCASTING DISPLAYER PANEL

FIELD OF THE INVENTION

The present invention relates to a flash memory broadcast displayer of a screen size 43 to 133 cm, and a weight of 1 to 10 kg.

BACKGROUND OF THE INVENTION

The most powerful broadcasting media these days is television. Therefore, many commercials today are produced in the form of moving picture frames whose running time is less than 30 seconds. People are becoming increasingly familiar with such types of TV commercials on streets and in supermarkets, as well. However, many kinds of expensive, bulky, power consuming supplementary instruments such as a personal computer, recording medium, player, and cables are required for such commercials. Another drawback is that it is difficult to frequently change the contents of the advertisement. Though flash memory is increasingly being used in mass storage applications because of its small size, low power consumption, high speed, and high reliability features, lack of a proper system for an isolated broadcasting displayer prevents wide spread of moving-picture broadcasting. It is the purpose of the current invention to provide a simple, cheap and easily contents changeable isolated moving picture broadcasting displayers in streets and supermarkets.

DESCRIPTION OF THE PRIOR ART

U.S. Pat. No. 6,269,173 to Hsien illustrates an interactive instant response broadcast board comprised of a microcomputer and a plurality of display broadcast boards and a plurality of detecting elements arranged thereon that detect the movement of objects in front of the broadcast boards, and transmits information to the microcomputer. A host server transmits and receives information to and from broadcast boards and extracts the information read from the microcomputer and detected by the detecting elements, and downloads the image messages and programs to at least one broadcast board for displaying. Numerous accessory lines are needed.

U.S. Pat. No. 5,928,347 to Jones introduces a removable memory card interface apparatus enabling a memory card to communicate with a number of peripheral devices directly without the need for the memory card's host or a host computer. The interface apparatus includes a micro-controller operating with an internal bus to control, process and route signals between the removable memory and a peripheral device via a series of memory and device interfaces. A control panel and/or remote control allow a user to interact with the interface apparatus. In one embodiment, the interface apparatus serves as a memory card printer controller or as a memory card player and/or recorder when interfaced with consumer electronics. It cannot directly connect LCD terminal with flash memory card.

None of the prior art utilizes a simple isolated mobile broadcasting board, which displays moving pictures stored in a flash memory card.

SUMMARY OF THE INVENTION

It is purpose of current invention to provide a simple, cheap, easy to install, and easily changed isolated moving picture broadcasting displayer for streets and supermarkets. The broadcasting displayer is comprised of 1) a flash memory card, 2) an interface card, and 3) an Liquid Crystal Displayer with control cards. Time sequence type files, which are stored in the flash memory card, are processed by the interface card and transferred to the Liquid Crystal Displayer. The interface card includes a microprocessor operating with an internal bus to control, process and route signals between the flash memory and the LCD player. The interface card and flash memory card receiver is installed on the rear face of LCD screen.

DETAILED DESCRIPTION OF THE PREFERRED EMBODIMENT

Figure 1:
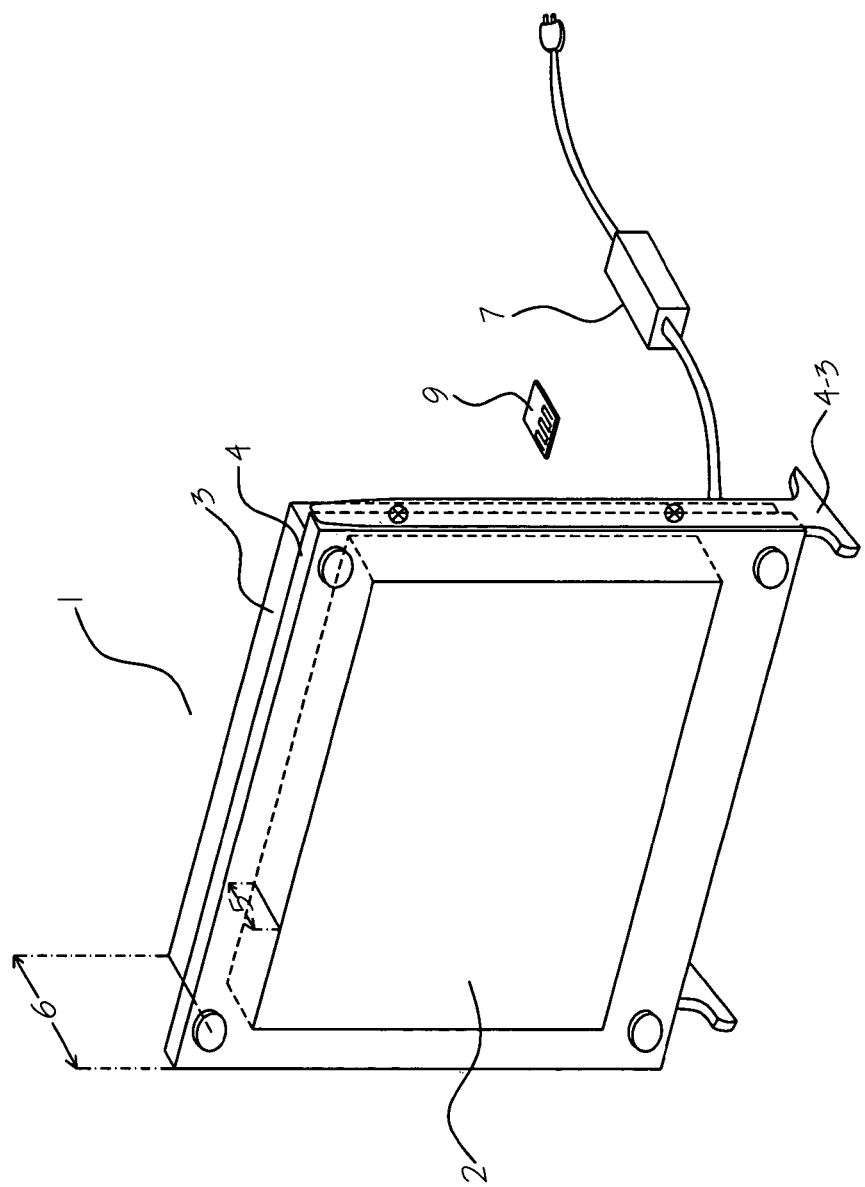
FIG. 1 is a perspective view of the flash moving picture broadcasting displayer of the current invention.
Figure 2:
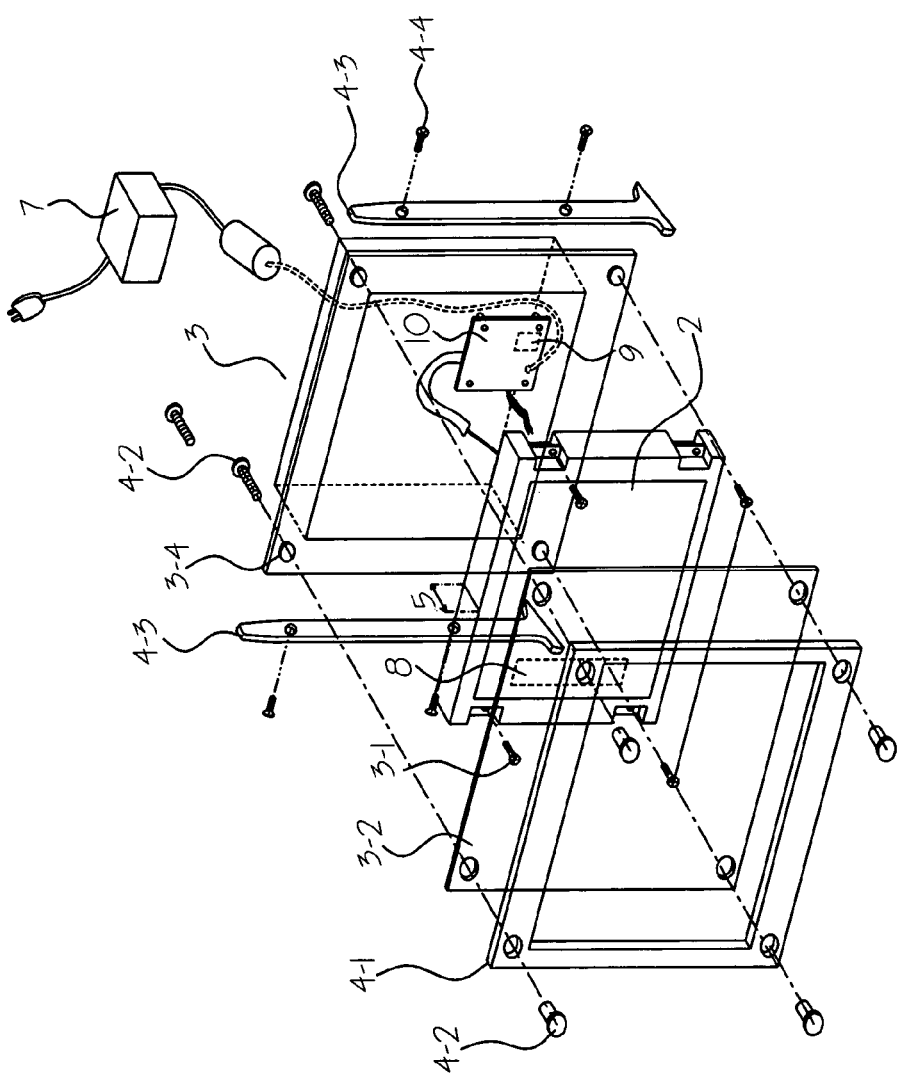
FIG. 2 is an exploded view of the flash moving picture broadcasting displayer of current invention.

FIG. 1 illustrates a perspective view of the flash moving picture broadcasting displayer (1) of current invention. And FIG. 2 is an exploded view of the flash moving picture broadcasting displayer (1). An LCD displayer (2) is mounted in a steel case (3) by four screw bolts (3-1). The steel case (3), containing the LCD displayer (2) inside, is framed with transparent plastic frames (4) made of solid plastic such as PMMA (Poly Methylmethacrylate), PVC (Poly Vinyl Chloride), PC (Poly Carbonate), PS (Polystyrene). A rubber sheet spacer (3-2) is inserted between front frame (4-1) and front brim (3-4) of the steel case (3). The front brim (3-4) of the steel case (3) and the front frame (4-1) are fastened with four bolts and nuts (4-2). Side frames (4-3) are fixed to the steel case with another four screw bolts (4-4) to form a standing support. The screen size of the LCD displayer (2) ranges from 43 to 133 cm (17 to 52 inches). The thickness (5) of LCD player (2) ranges from 2 to 2.5 cm and the overall thickness (6) of the steel case (3) is 3 to 3.5 cm depending on the screen size. Bigger screen is thicker. The weight of the broadcasting displayer of current invention is in the range of 1 to 10 Kg. 12V DC is supplied to the LCD displayer (2) by 120V AC to 12V DC transducer (7). The electric power is supplied to electric power control panel (8) of the LCD displayer (2) attached to the right corner of the rear of the LCD displayer (2). A flash memory card (9), having memory size of from 10 MB to 5 GB, is utilized for information source. The flash memory card (9) is engaged to an interface card (10) located and attached to the bottom of the inner surface of the steel case (3). Image data stored in the flash memory card (9) is processed by the interface card (10) and transferred to an image controlling card (11), which is attached at the left upper corner of the LCD displayer (2).

Figure 3:
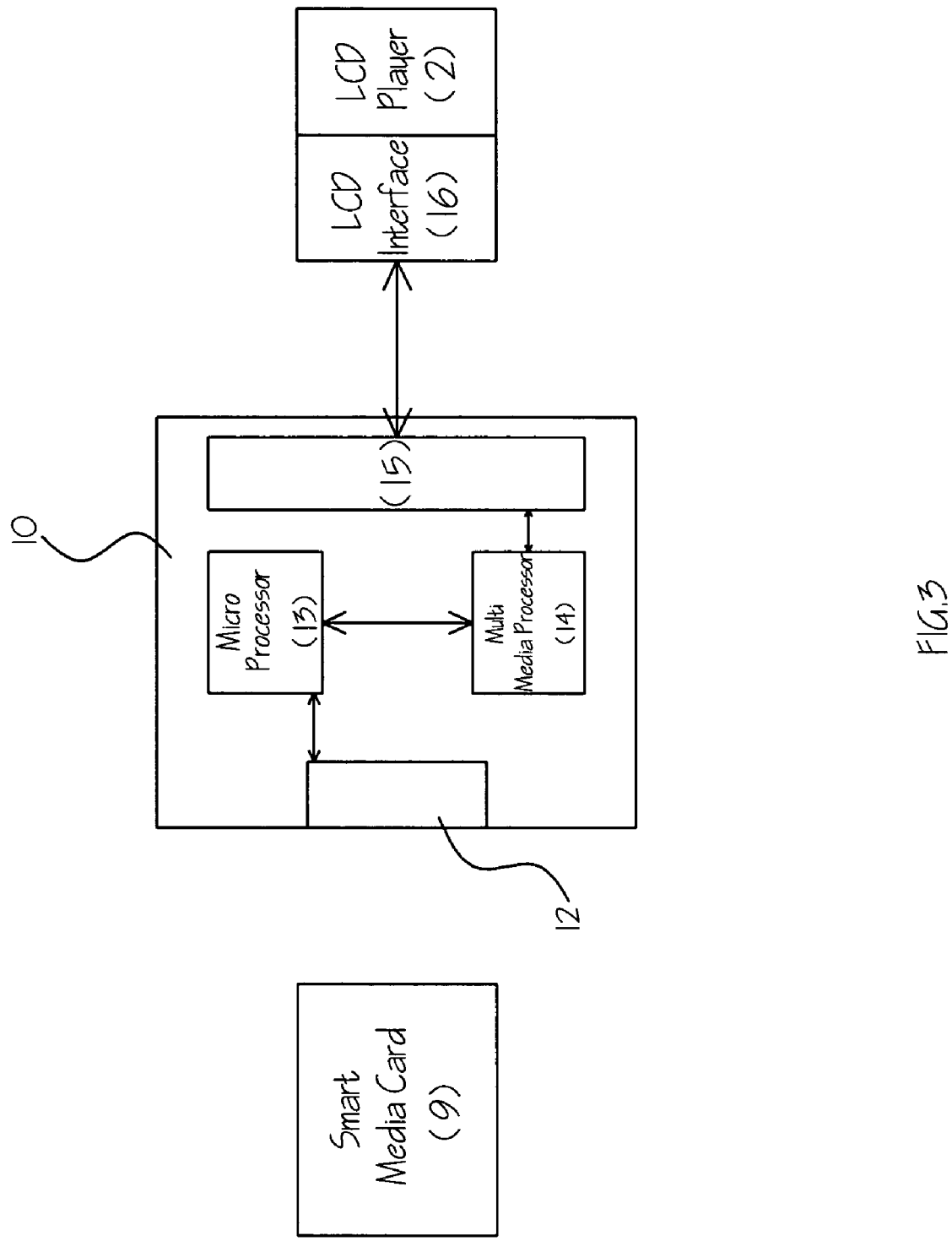
FIG. 3 is a schematic block diagram of the interface of current invention.

FIG. 3 is a schematic block diagram of the interface card (10) of the current invention. The interface card is comprised of a flash memory card interface (12), a micro processor (13), a multimedia processor (14), and a BUS (15) mounted on a cardboard. An LCD interface (16) is installed in the image-controlling card (11) attached to the LCD displayer (2). By storing different contents of broadcasting to different flash memory cards (9), a cheap, variant and isolated broadcasting in one place is realized. Every flash LCD displayer (1) of the current invention in one supermarket may have a flash memory card (9) of different contents. For example, if one flash memory card (9) contains ten commercial broadcasting contents and ten LCD displayers (1) are installed at supermarket counters, one hundred different commercial broadcastings can be displayed in one place. Change, addition and replacement of the broadcasting contents are extremely simple. Just replace the flash memory card (9) or download new contents into the old one. Prior broadcasting displayers installed in a supermarket all display the same advertisement, regardless of the number of displayers. This is because the central display controller repeatedly plays the same contents until a new DVD or VHS arrives.

What is claimed is:

1. A flash moving picture broadcasting displayer comprised of 1) a flash memory card of memory size less than 5 GB, 2) an interface card, which is comprised of a flash memory card interface, a micro processor, a multimedia processor, and a BUS mounted on a card board, 3) an LCD displayer stored in a metal case, which is framed with transparent plastic frames made of PMMA (Poly Methylmethacrylate, and equipped with an electric power control panel attached to the right corner of the rear face thereof and equipped with an LCD interface installed in the image controlling card, which is attached to the left upper corner of the rear face of the LCD displayer.

2. A flash moving picture broadcasting displayer comprised of 1) a flash memory card of memory size less than 5 GB, 2) an interface card, which is comprised of a flash memory card interface, a micro processor, a multimedia processor, and a BUS mounted on a card board, 3) an LCD displayer stored in a metal case, which is framed with transparent plastic frames made of PVC (Poly Vinyl Chloride), and equipped with an electric power control panel attached to the right corner of the rear face thereof and equipped with an LCD interface installed in the image controlling card, which is attached to the left upper corner of the rear face of the LCD displayer.

3. A flash moving picture broadcasting displayer comprised of 1) a flash memory card of memory size less than 5 GB, 2) an interface card, which is comprised of a flash memory card interface, a micro processor, a multimedia processor, and a BUS mounted on a card board, 3) an LCD displayer stored in a metal case, which is framed with transparent plastic frames made of PC (Poly Carbonate), and equipped with an electric power control panel attached to the right corner of the rear face thereof and equipped with an LCD interface installed in the image controlling card, which is attached to the left upper corner of the rear face of the LCD displayer.

4. A flash moving picture broadcasting displayer comprised of 1) a flash memory card of memory size less than 5 GB, 2) an interface card, which is comprised of a flash memory card interface, a micro processor, a multimedia processor, and a BUS mounted on a card board, 3) an LCD displayer stored in a metal case, which is framed with transparent plastic frames made of PS (Polystyrene), and equipped with an electric power control panel attached to the right corner of the rear face thereof and equipped with an LCD interface installed in the image controlling card, which is attached to the left upper corner of the rear face of the LCD displayer.

* * * * *